(12) United States Patent
Bell et al.

(10) Patent No.: US 11,708,918 B1
(45) Date of Patent: Jul. 25, 2023

(54) GRIP ENHANCING LOW-PIM CABLE TIE ANCHOR

(71) Applicant: ConcealFab, Inc., Colorado Springs, CO (US)

(72) Inventors: Thomas Bell, Colorado Springs, CO (US); Jacob Lovelady, Colorado Springs, CO (US)

(73) Assignee: ConcealFab, Inc., Colorado Springs, CO (US)

( * ) Notice: Subject to any disclaimer, the term of this patent is extended or adjusted under 35 U.S.C. 154(b) by 0 days.

(21) Appl. No.: 18/187,575

(22) Filed: Mar. 21, 2023

Related U.S. Application Data

(60) Provisional application No. 63/322,421, filed on Mar. 22, 2022.

(51) Int. Cl.
*F16L 3/22* (2006.01)
*H02G 3/32* (2006.01)
*F16L 3/04* (2006.01)
*F16L 3/10* (2006.01)
*F16B 21/08* (2006.01)
*F16B 2/04* (2006.01)

(52) U.S. Cl.
CPC ............ *F16L 3/221* (2013.01); *F16B 21/086* (2013.01); *F16L 3/04* (2013.01); *F16L 3/10* (2013.01); *H02G 3/32* (2013.01); *F16B 2/04* (2013.01)

(58) Field of Classification Search
CPC ..... F16L 3/221; F16L 3/04; F16L 3/10; F16B 21/086; F16B 2/04; F16B 2/08; F16B 5/123; H02G 3/32; Y10T 403/7147; Y10T 403/7176; Y10T 403/7182

USPC ................................ 411/508, 509, 510, 913
See application file for complete search history.

(56) References Cited

U.S. PATENT DOCUMENTS 3,550,219 A * 12/1970 Van Buren Jr. .......... F16L 3/233
248/74.5
3,632,071 A * 1/1972 Cameron .................. F16L 3/10
248/205.3
(Continued)

FOREIGN PATENT DOCUMENTS

EP 1510295 A2 * 3/2005 ............... H01H 3/16
EP 1772935 A2 6/2012
(Continued)

*Primary Examiner* — Kimberly T Wood
(74) *Attorney, Agent, or Firm* — Mehrman Law Office; Michael J. Mehrman

(57) ABSTRACT

A low-PIM, self-tightening cable tie anchor in which tightening the cable tie enhances the gripping force applied to the mounting structure. The grip enhancing cable tie anchor includes a pair of anchor levers connected by a fulcrum. Each anchor lever includes an interface cleat that extends above the fulcrum, a cable tie slot that extends through the interface cleat, a flange positioned below the cable tie slot, and a leg extending from the flange. Each leg includes a barb spaced apart from the flange. The flange and barb form a mounting structure slot for removably attaching the cable tie anchor to the mounting structure. The barbs are inserted through a receptacle, typically a mounting hole, on the mounting structure. The barbs capture the mounting structure, while the fulcrum and cable tie slots capture the cable tie, without the use of hands, to facilitate tightening the cable tie with both hands.

20 Claims, 11 Drawing Sheets

(56) References Cited

U.S. PATENT DOCUMENTS

| | | | |
|---|---|---|---|
| 4,795,116 A * | 1/1989 | Kohut | F16B 21/086 |
| | | | 411/908 |
| 5,759,004 A | 6/1998 | Kuffel | |
| 7,861,981 B2 * | 1/2011 | Olver | H02G 3/32 |
| | | | 248/65 |
| D682,793 S | 5/2013 | Igelmund | |
| D871,191 S | 12/2019 | Mogensen | |
| 10,508,757 B2 | 12/2019 | Vaccaro | |
| D875,689 S | 2/2020 | Smith | |
| D911,981 S | 3/2021 | Varale | |
| 11,002,383 B2 | 5/2021 | Naugler | |
| 2007/0290100 A1 | 12/2007 | Caveney | |
| 2021/0192992 A1 | 6/2021 | Vaccaro et al. | |
| 2021/0281059 A1 | 9/2021 | Vaccaro et al. | |

FOREIGN PATENT DOCUMENTS

| | | | | |
|---|---|---|---|---|
| JP | S54123653 A | | 9/1979 | |
| JP | 06327124 A | * | 11/1994 | F16L 3/233 |
| JP | 2007143274 A | | 12/2011 | |
| WO | 2021050316 A1 | | 3/2021 | |

* cited by examiner

GRIP ENHANCING LOW-PIM CABLE TIE ANCHOR

REFERENCE TO RELATED APPLICATIONS

This application claims priority to U.S. Provisional Patent Application Ser. No. 63/322,421 filed Mar. 22, 2022, which is incorporated by reference.

TECHNICAL FIELD

The present invention is directed to cellular communication systems and, more particularly, to a low-PIM, self-tightening cable tie anchor suitable for securing communication, control, and other cables at cellular base station antenna sites.

BACKGROUND

An essential element of modern mobile communications systems is the "cell site." The cell site includes one or more cellular base station antennas aimed at a desired geographical area of coverage. The performance of a cell site is often limited by passive intermodulation ("PIM") interference. PIM interference occurs when the high-power downlink signals (the "main beam") transmitted by the base station antenna mixes at passive, non-linear junctions in the RF path, creating new signals. When these new signals (intermodulation products) fall in an antenna's uplink band, they act as interference and reduce the signal-to-interference-plus-noise ratio ("SINR"). As the SINR reduces, the geographic coverage of the cell site reduces and the data capacity of that cell site reduces.

It is well documented that loosely touching metal-to-metal surfaces can behave in a non-linear fashion and become sources of passive intermodulation when illuminated by high power RF signals. Recently, it has been determined that loose metal-to-metal connections located behind base station antennas are also able to generate high levels of passive intermodulation. Even though this region is well outside the main beam of the antenna, enough RF energy is present in this region to excite non-linear objects and generate PIM.

Metal mounting plates and with metal cable hangers for supporting RF, optical, ground and remote electrical tilt ("RET") cables are common sources of loose metal-to-metal contact found in the region behind and close to base station antennas. These cables are typically secured along their length to the antenna support frame to prevent the cables from moving in the wind. Antenna support frames are often constructed using structural steel angle and pipe supports with metal mounting plates and metal cable hangers used to secure the cables to the frame. Loose metal-to-metal contacts between metal cable hangers and metal mounting structures can be a significant source of PIM noise.

A reliable, inexpensive, easy to deploy, and robust cable support solution is therefore needed to secure communication, control, and other cables to steel support structures in the PIM-reactive zones of cellular base station antennas.

SUMMARY

The needs described above are met by a grip-enhancing cable tie anchor suitable for securing cables generally and, more particularly for securing communication, control, and other cables at cellular base station antenna sites. The grip-enhancing cable tie anchor includes a first anchor lever with a first interface cleat, a first flange coupled to the first interface cleat, and a first leg coupled to the first flange. The first leg includes a first barb forming a first mounting structure slot between the first flange and the first barb. Similarly, a second anchor lever includes a second interface cleat, a second flange coupled to the second interface cleat, and a second leg coupled to the second flange. The second leg includes a second barb forming a second mounting structure slot between the second flange and the second barb. A fulcrum pivotally attached to the first and second anchor cleats is positioned so that a cable tie routed through the first and second cable tie slots contacts the fulcrum. As a result, a tightening force applied to the cable tie imparts an axial force in an axial direction on the fulcrum, which imparts a tilting or pinching force biasing the first and second legs away from each other causing a gripping force on a mounting structure captured in the first and second mounting structure slots. The pinching or tilting force may also bias the first and second interface cleats toward each other.

In an illustrative embodiment, the barbs capture the mounting structure, without the use of hands, to facilitate tightening the cable tie after the cable tie anchor has been inserted through the mounting hole. Similarly, the fulcrum and cable tie slots capture the cable tie in the cable tie anchor, without the use of hands, to facilitate tightening the cable tie after the cable tie has been inserted through the cable tie slots. The fulcrum includes a protruding surface that contacts the cable tie to create the interference fit. The protruding surface is also positioned for flexing in the axial direction in response to the axial force applied by the cable tie when the cable tie is tightened. In addition, the first and second interface cleats may each have rounded interface surfaces (rounded corners) for contacting a support structure tightened against the cable tie anchor by the tightening force. The cable tie anchor may include a polymeric low-PIM material in contact with the mounting structure. For example, the cable tie anchor may be fabricated entirely from a polymeric material.

The invention may also be embodied as a cable support assembly that includes a grip-enhancing cable tie anchor, a mounting structure received in the first and second mounting structure slots, and an interface structure positioned against the interface cleats. The assembly also includes a cable tie routed through the first and second cable tie slots and around the interface structure, with the fulcrum positioned so that the cable tie contacts the fulcrum and a tightening force on the cable tie imparts an axial force in an axial direction on the fulcrum. The axial force imparts a pinching or tilting force biasing the first and second legs away from each other imparting a gripping force on the mounting structure captured in the first and second mounting structure slots. In a specific example, the mounting structure may include a mounting hole engaged with the first and second mounting structure slots, and the interface structure may include or support one or more cables, such as one or more cables or a cable grommet engaging one or more cables.

The invention may also be practiced by positioning an interface structure against the interface cleats of a grip enhancing cable tie anchor, routing a cable tie through the first and second cable tie slots and around the interface structure with the fulcrum positioned in contact with the cable tie. A tightening force is the applied on the cable tie to impart an axial force in an axial direction on the fulcrum. The axial force imparts a pinching or tilting force biasing the first and second legs away from each other imparting a gripping force on the mounting structure captured in the first and second mounting structure slots. Once the first and second barbs of the cable tie anchor are inserted through the mounting structure, the barbs may create an interference fit with the mounting hole retaining the cable tie anchor in the mounting hole without the use of hands. In addition, once the cable tie is inserted through the cable tie slots, the fulcrum and the cable tie slots may create an interference fit with the cable tie retaining the cable tie in the cable tie slots without the use of hands.

The method may also include providing the grip-enhancing cable tie anchor with a polymeric material in contact with the mounting structure, positioning the cable tie anchor in a PIM reactive zone of a cellular base station antenna, and supporting one or more cables extending from the antenna with the grip-enhancing cable tie anchor. The mounting structure may include a metal mounting plate coupled to a structure supporting the antenna, and the interface structure may include multiple cables extending form the antenna.

It will be understood that specific embodiments may include a variety of features in different combinations, as desired by different users. The specific techniques and systems for implementing particular embodiments of the invention and accomplishing the associated advantages will become apparent from the following detailed description of the embodiments and the appended drawings and claims.

BRIEF DESCRIPTION OF THE FIGURES

The numerous advantages of the embodiments of the invention may be better understood with reference to the accompanying figures.

DETAILED DESCRIPTION

Figure 1:
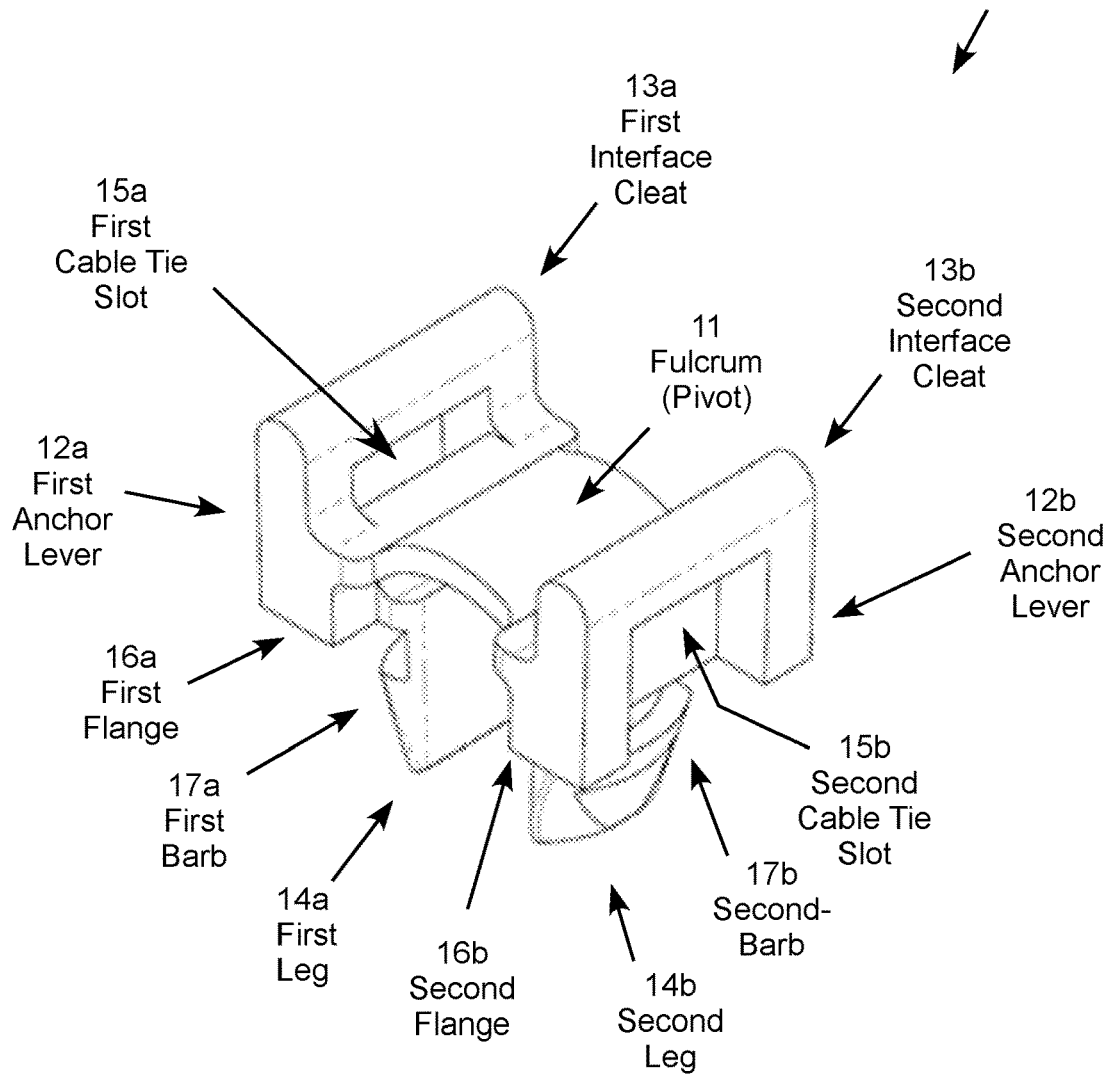
FIG. 1 is a perspective view of a grip-enhancing cable tie anchor.

Embodiments of the invention include a grip-enhancing cable tie anchor for cellular communication systems and, more particularly, to a low-PIM cable tie anchor in which tightening the cable tie enhances the gripping force applied to the mounting structure. The grip enhancing cable tie anchor includes a pair of anchor levers connected by a fulcrum. Each anchor lever includes an interface cleat that extends above the fulcrum, a cable tie slot that extends through the interface cleat, a flange positioned below the cable tie slot, and a leg extending from the flange. Each leg includes a barb spaced apart from the flange. The flange and barb form a mounting structure slot for engaging a mounting structure to removably attach the cable tie anchor to the mounting structure. The legs are inserted through a receptacle, typically a hole, on the mounting structure. The mounting structure slots capture the mounting structure between the flange and the barb to attach the cable tie anchor to the mounting structure. The barbs capture the mounting structure, without the use of hands, to facilitate tightening the cable tie after the cable tie anchor has been inserted through the mounting hole. Similarly, the fulcrum and cable tie slots capture the cable tie in the cable tie anchor, without the use of hands, to facilitate tightening the cable tie after the cable tie has been inserted through the cable tie slots.

A cable tie is inserted through the cable tie slots, which are positioned so that the cable tie is deflected over the fulcrum creating an interference engagement between the bottom side of the cable tie and the top of the fulcrum. The shape and spacing between the first and second legs allows the legs to be deflect slightly (inward) transverse to the axial direction for insertion into the mounting hole. Once the barbs are inserted through the mounting hole, the cable tie anchor creates an interference engagement that retains the cable tie anchor in the mounting hole, without the use of hands ,preventing the cable tie anchor from falling out of the mounting hole before the cable tie is tightened. Similarly, once the cable tie is inserted through the cable tie slots, the fulcrum and cable tie slots create an interference engagement that retains the cable tie in the cable tie slots, without the use of hands, preventing the cable tie from falling out of the cable tie anchor before the cable tie is tightened. These interference engagements facilitate tightening the cable tie with both hands once the cable tie has been inserted through the cable tie slots, and the barbs have been inserted through the mounting hole.

When a tightening force (outward) is applied to the cable tie, this imparts an axial (downward) force on the fulcrum, which causes the anchor levers to pivot on the fulcrum. This pivoting force imparts a pinching or tilting (inward) force biasing the interface cleats towards each other, while simultaneously imparting a gripping (outward) force biasing the legs away from each other, which enhances the gripping force attaching the cable tie anchor to the receptacle of the mounting structure.

Turning to the figures, reference will now be made in detail to embodiments of the invention. In general, the same or similar reference numerals are used in the drawings and the description to refer to the same or like parts or steps. The drawings are in simplified form and are not to precise scale unless specifically indicated. The words "couple" and similar terms do not necessarily denote direct and immediate connections, but also include connections through intermediate elements or devices. Certain descriptors, such "first" and "second," "top and bottom," "upper" and "lower," "inner" and "outer," or similar relative terms may be employed to differentiate structures from each other. These descriptors are utilized as a matter of descriptive convenience and are not employed to implicitly limit the invention to any particular position or orientation.

It will be understood that specific embodiments may include a variety of features and options in different combinations, as may be desired by different users. Practicing the invention does not require utilization of all, or any particular combination, of these specific features or options. The specific techniques and structures for implementing particular embodiments of the invention and accomplishing the associated advantages will become apparent from the following detailed description of the embodiments and the appended drawings and claims.

Figure 2:
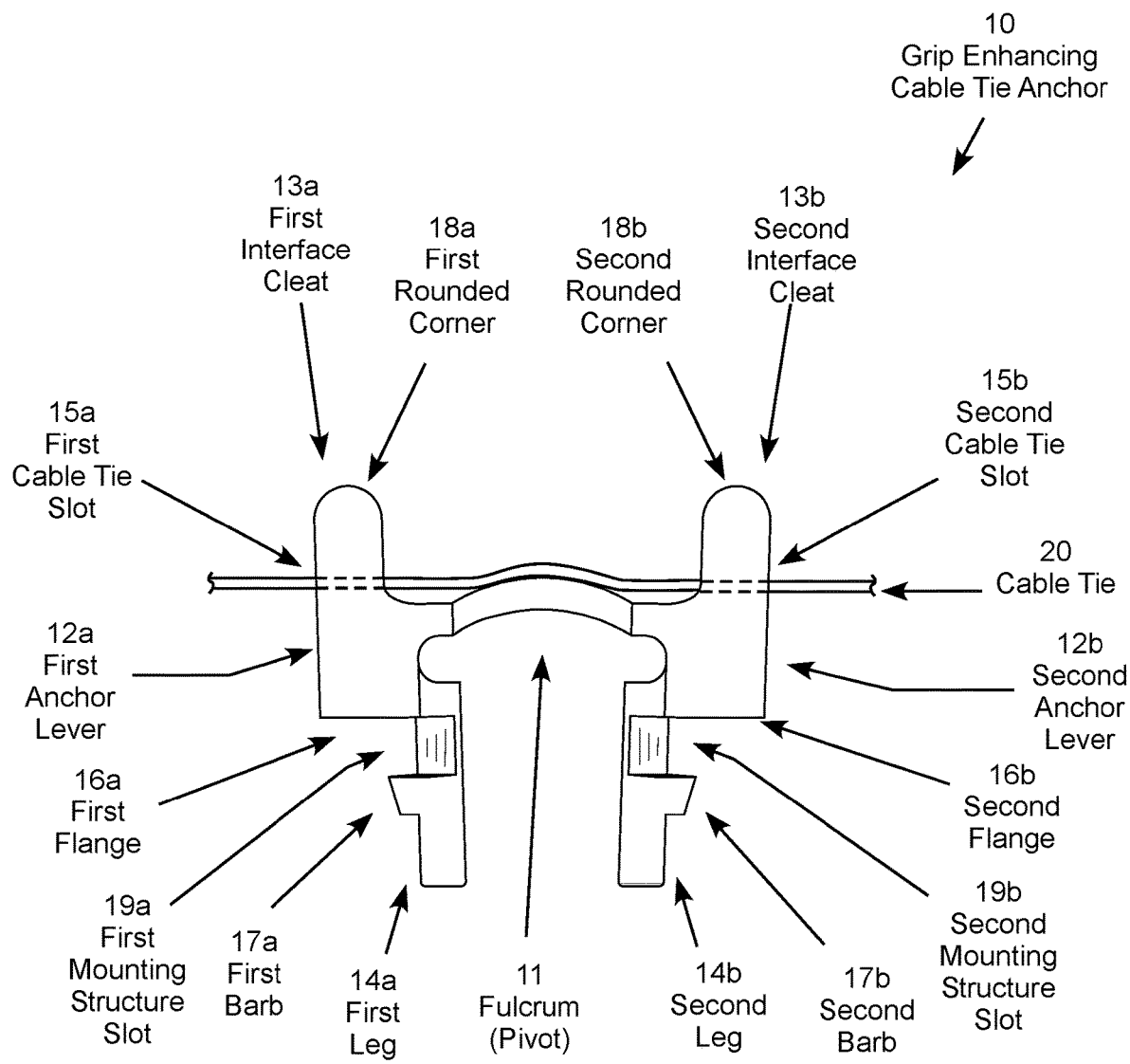
FIG. 2 is an front view of the grip-enhancing cable tie anchor.
Figure 3:
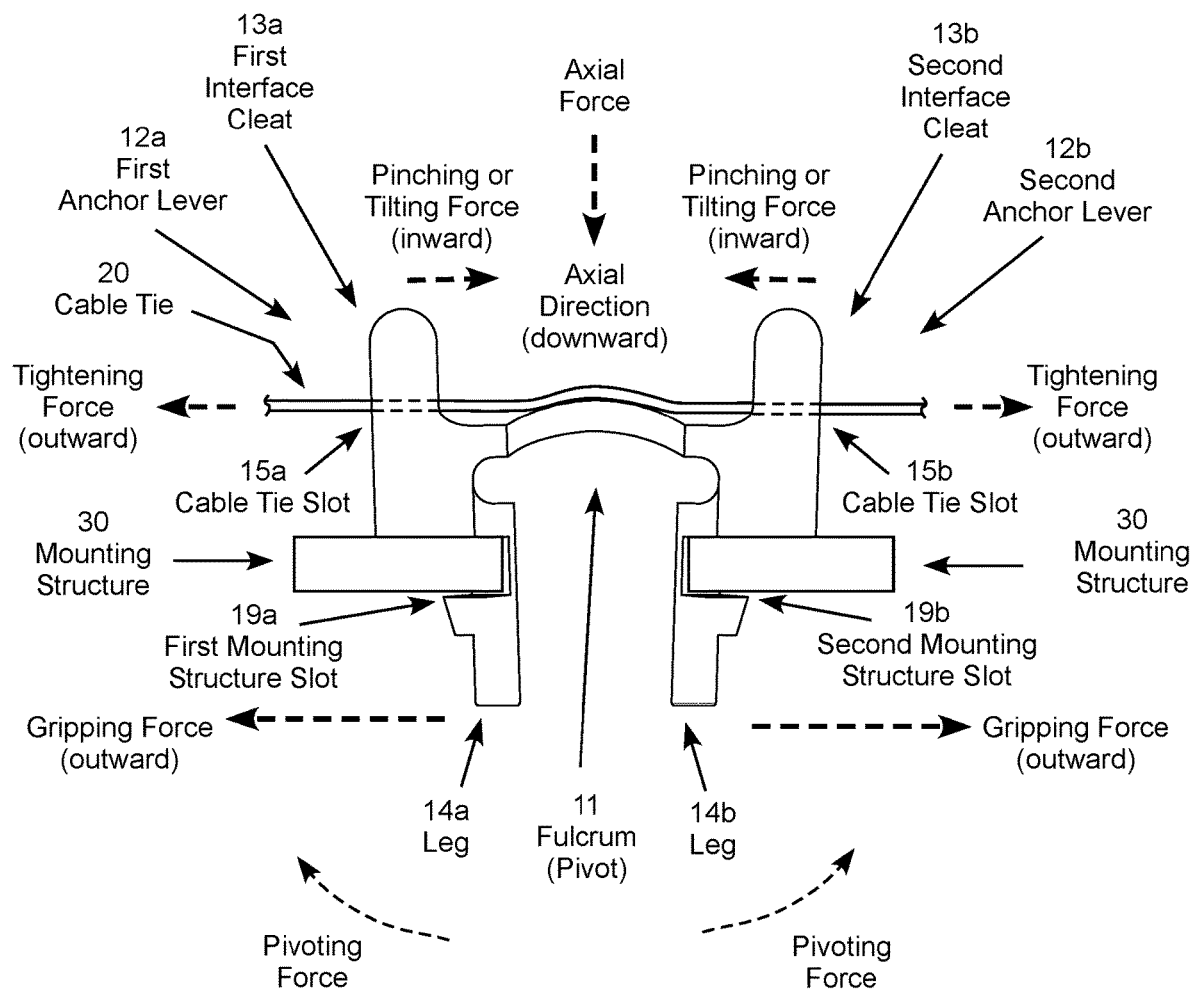
FIG. 3 is a front view of the grip-enhancing cable tie anchor secured to a mounting structure.

FIG. 1 is a perspective view of a grip-enhancing cable tie anchor 10, FIG. 2 is a side view showing the grip-enhancing cable tie anchor with a cable tie 20 inserted through the cable tie slots 15a and 15b, and FIG. 3 shows the grip-enhancing action caused by tightening the cable tie.

The cable tie anchor 10 includes a protruding fulcrum 11, such as an arcuate bridge, extending between anchor levers 12a and 12b that articulate about pivots where the anchor levers join the fulcrum 11. The upper portion of the first anchor lever 12a forms a first interface cleat 13a, while the bottom portion of the first anchor lever 12a forms a first leg 14a. Similarly, the second anchor lever 12b forms a second interface cleat 13b, while the bottom portion of the second anchor lever 12b forms a second leg 14b. The first anchor lever 12a also forms the first cable tie slot 15a above the pivot with the fulcrum 11 and a first flange 16a below the pivot. Similarly, the second anchor lever 12b forms a second cable tie slot 15b above the pivot with the fulcrum 11 and a second flange 16b below the pivot. The first leg 14a of the first anchor lever 12a carries a first barb 17a that, together with the first flange 16a, forms a first mounting interface slot 19a for receiving a mounting structure 30, such as a hole in the mounting plate. Similarly, the second leg 14b of the second anchor lever 12b carries a second barb 17b that, together with the second flange 16b, forms a second mounting interface slot 19b for receiving the mounting structure 30. In this particular example, the first and second mounting interface slots 19a and 19b each include a rounded mounting structure interface surface contoured to match a round mounting hole. In addition, the interface cleats 13a and 13b include rounded corners 18a and 18b, respectively, allowing them to slide under the interface structure when the diameter of the interface structure is too large or too small to be pinched between the interface cleats.

FIG. 3 shows the grip-enhancing action of the cable anchor 10. In this example, the fulcrum 11 provides a protruding bridge facing away (upward) from the mounting interface slots 19a and 19b, while the cable slots 15a and 15b are positioned so that the cable tie 20 routed through the cable tie slots passes over forming an interference fit in contact with the center portion of the fulcrum. As a result, a tightening (outward) force on the cable tie 20 causes a (downward) force toward the mounting interface slots 19a and 19b on the fulcrum 11. The downward force on the fulcrum 11 creates a pivoting force on the anchor levers 12a and 12b biasing the interface cleats 13a and 13b toward each other imparting a pinching or tilting (inward) force between the interface cleats. The interface cleats create a pinching force when the interface structure is captured between the interface cleats 13a and 13b, while they create a tilting force when the interface structure is on top of the interface cleats. The pivoting force of the anchor levers 12a and 12b simultaneously biases the legs 14a and 14b away from each other imparting a gripping (outward) force on the slots securing the mounting structure 30 in the mounting interface slots 19a and 19b. Increasing the tightening force on the cable tie 20 therefore increases the pinching or tilting (inward) force between the interface cleats 13a and 13b while simultaneously increasing the gripping (outward) force on the mounting interface slots 19a and 19b securing the mounting structure 30 in the slots.

Once inserted into the mounting hole, the barbs 17a, 17b create an interference engagement that retains the cable tie anchor in a mounting hole without the use of hands preventing the cable tie anchor from falling out of the mounting hole before the cable tie 20 is tightened. Similarly, once the cable tie 20 is inserted through the cable tie slots 15a and 15b of the cable tie anchor 10, the fulcrum 11 and the cable tie slots 15a, 15b create an interference engagement that retains the cable tie in the cable tie slots without the use of hands preventing the cable tie from falling out of the cable tie anchor before the cable tie is tightened. This facilitates the use of both hands to tighten the cable tie 20 after the cable tie has been inserted through the cable tie slots 15a, 15b, and the barbs 17a, 17b have been inserted through the mounting hole.

Figure 4:
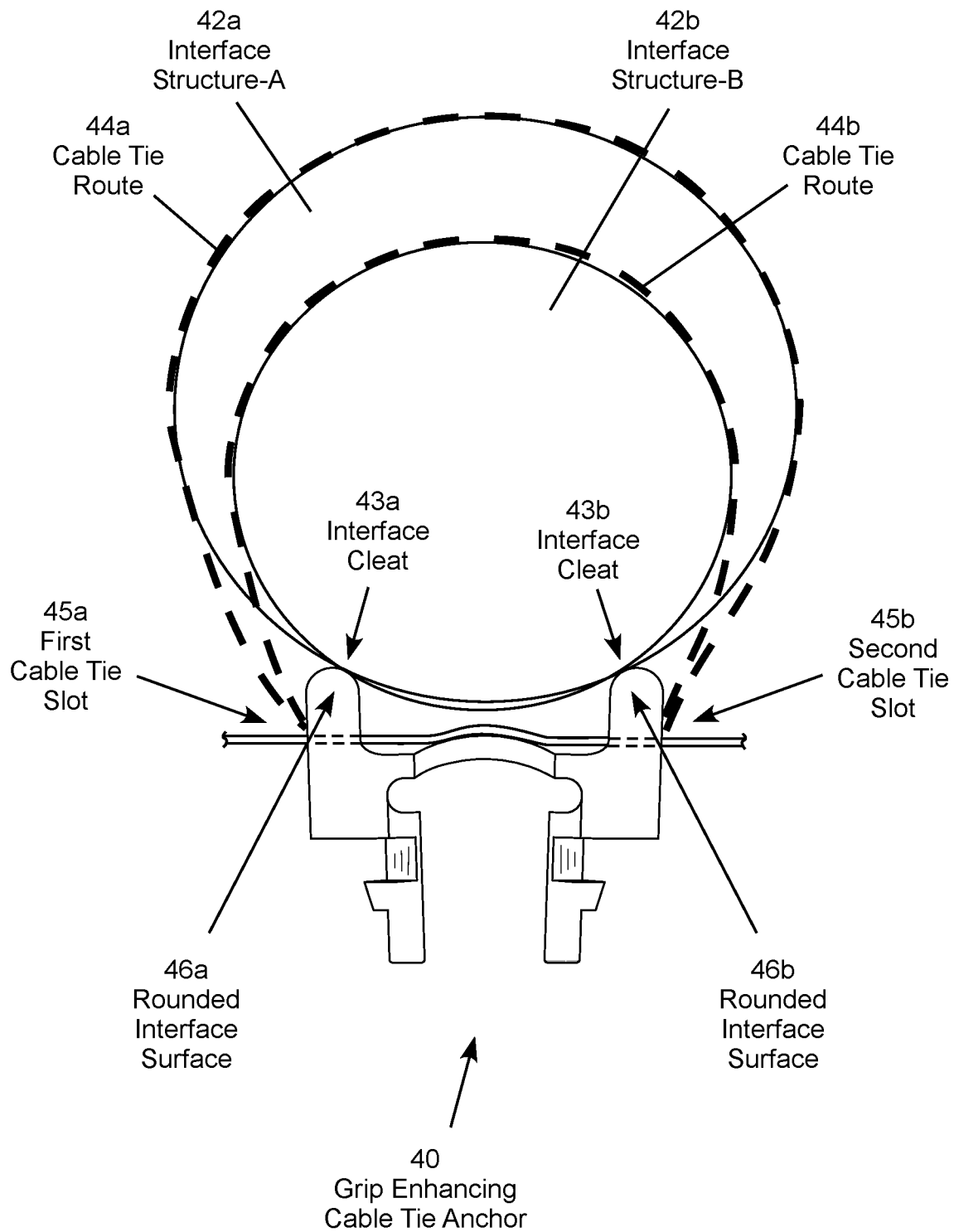
FIG. 4 is a front view of the grip-enhancing cable tie anchor illustrating attachment to different sized interface structures.

FIG. 4 is a front view of an alternative grip-enhancing cable tie anchor 40 secured to different sized interface structures 42a and 42b, such as cables, masts, frames, cable grommets, or other items attached to the cable tie anchor by routing the cable tie through the cable tie slots 45a and 45b and around an interface structure(s). The cable tie extends through the cable tie slots 45a and 45b of the cable tie anchor 40 and around interface structures 42a or 42b through respective cable tie routes 44a or 44b, respectively.

Figure 5:
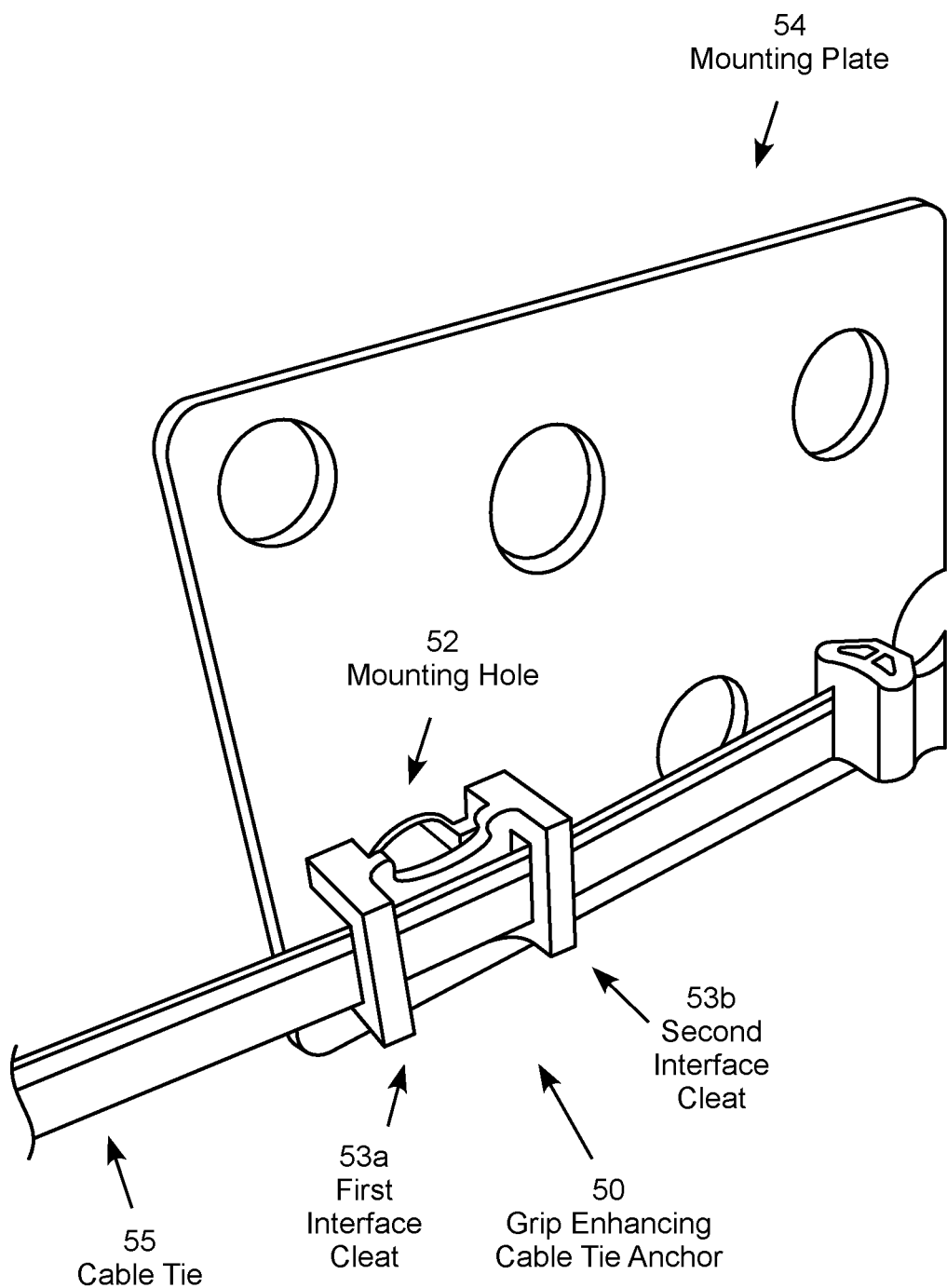
FIG. 5 is a perspective view of the grip-enhancing cable tie anchor secured to a mounting plate.

The interface cleats 43a and 43b have rounded interface surfaces (rounded corners) 46a and 46b, respectively, to accommodate interface structures with different sizes and shapes. The rounded interface surfaces 46a and 46b also help to mitigate distorting or tearing of the outer surfaces of the interface structures as the cable tie is tightened. In general, the cable tie anchor 40 may support a single interface structure, such as a single cable or cable grommet. Alternatively, cable tie anchor 40 may support multiple interface structures, such as multiple cables. More generally, the cable tie anchor 40 may support other types of interface structures, such as pole, conduits, wires, bundles or other. The interface structure typically extends in a transverse direction orthogonal or at an angle to the axial direction. In an alternative embodiment, the interface cleats may be modified to support interface structures extending in the axial direction away (upward) form the fulcrum. For example, the interface cleats may be extended and/or include attachment or gripping features, such as tie-bolt holes, clips, barbs, or high-friction surface treatments for engaging the interface structures FIG. 5 is a perspective view of a representative grip-enhancing cable tie anchor 50 secured to a mounting hole 52 through a mounting plate 54. Although not visible in this view, it will be appreciated that the mounting plate is received in slots similar to the mounting interface slots 19a and 19b shown in FIGS. 1-3, which are biased against the mounting plate 54 as the cable tie 55 is tightened around an interface structure positioned between or against the first and second interface cleats 53a and 53b. This particular example includes flat first and second interface cleats 53a and 53b as opposed to rounded interface cleats.

Figure 6:
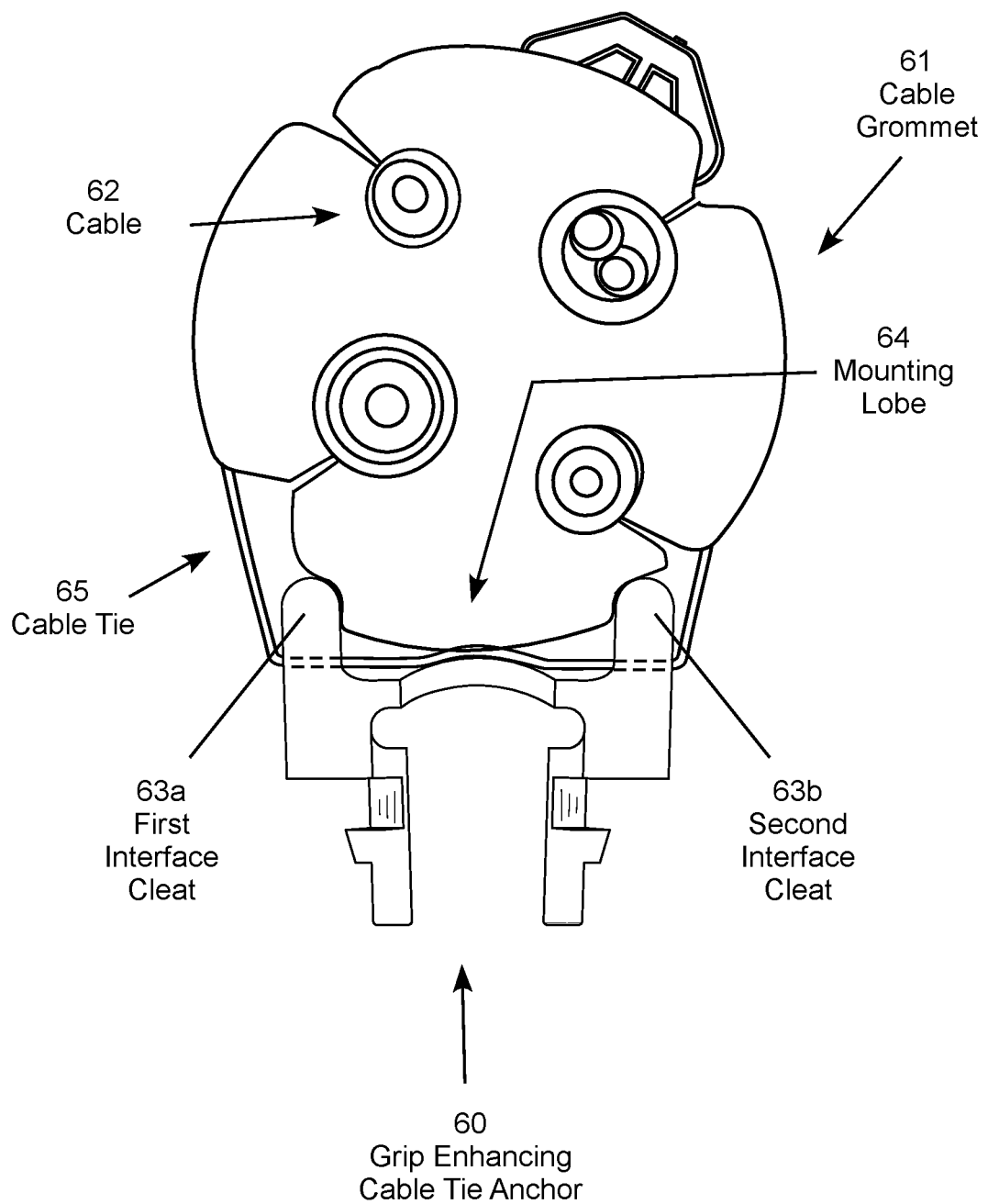
FIG. 6 is an end view of the grip-enhancing cable tie anchor secured to a cable grommet.

FIG. 6 is an end view of a representative grip-enhancing cable tie anchor 60 secured to a cable grommet 61, which supports several cables represented by the enumerated cable 62. The cable grommet 61 is formed of a flexible polymeric material that allows the first and second interface cleats 63a and 63b to pinch a mounting lobe 64 to as the cable tie 65 is tightened. The pinching action in the elastomeric mounting lobe 64 improves the grip on the cable grommet to prevent movement under the cable support wind and weight loads.

Figure 7:
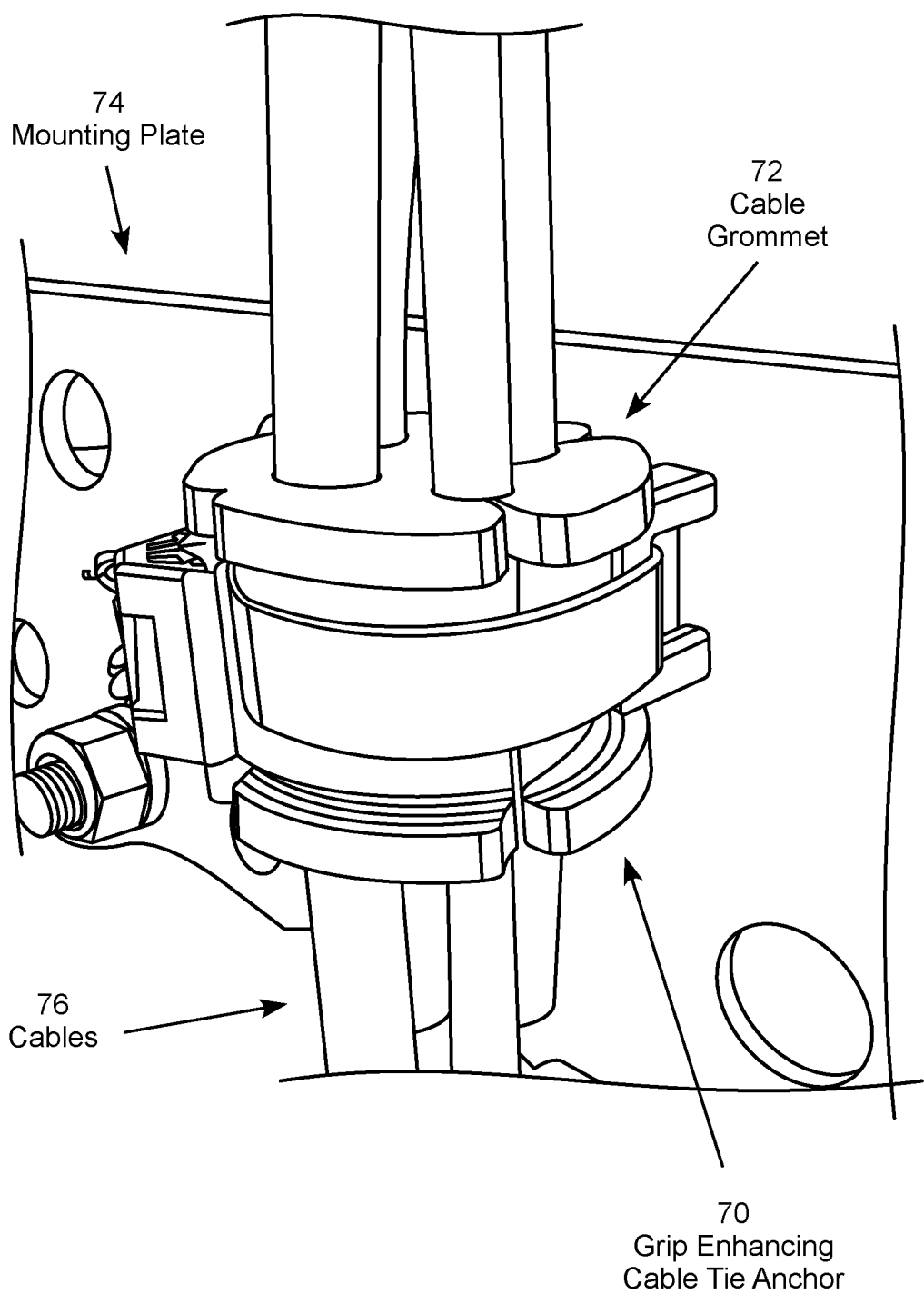
FIG. 7 is a perspective view of the grip-enhancing cable tie anchor securing a cable grommet to a mounting plate.
Figure 10A:
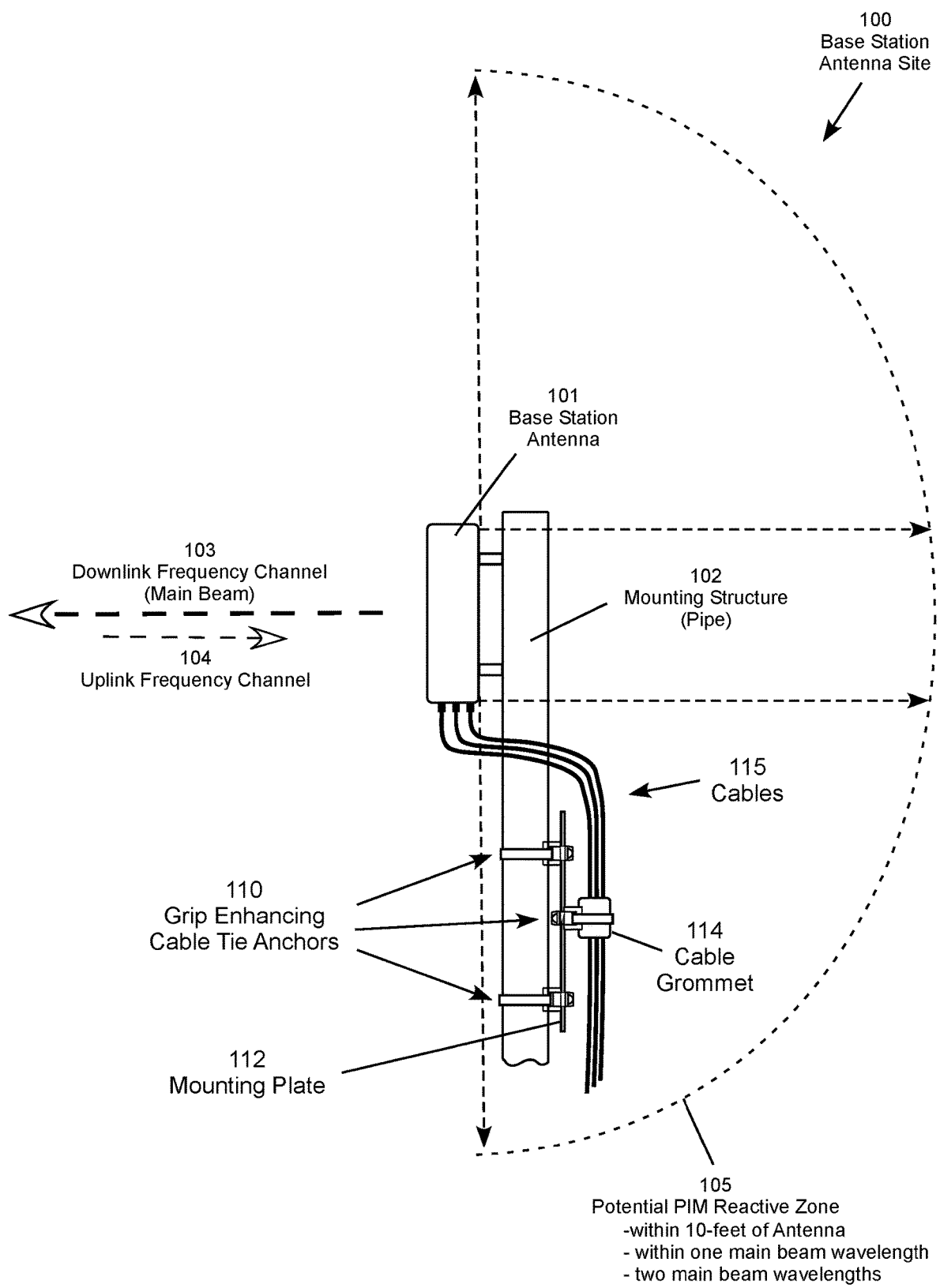
FIG. 10A is a conceptual side view of the grip-enhancing cable tie anchor positioned within a potential PIM reactive zone of a base station antenna.
Figure 10B:
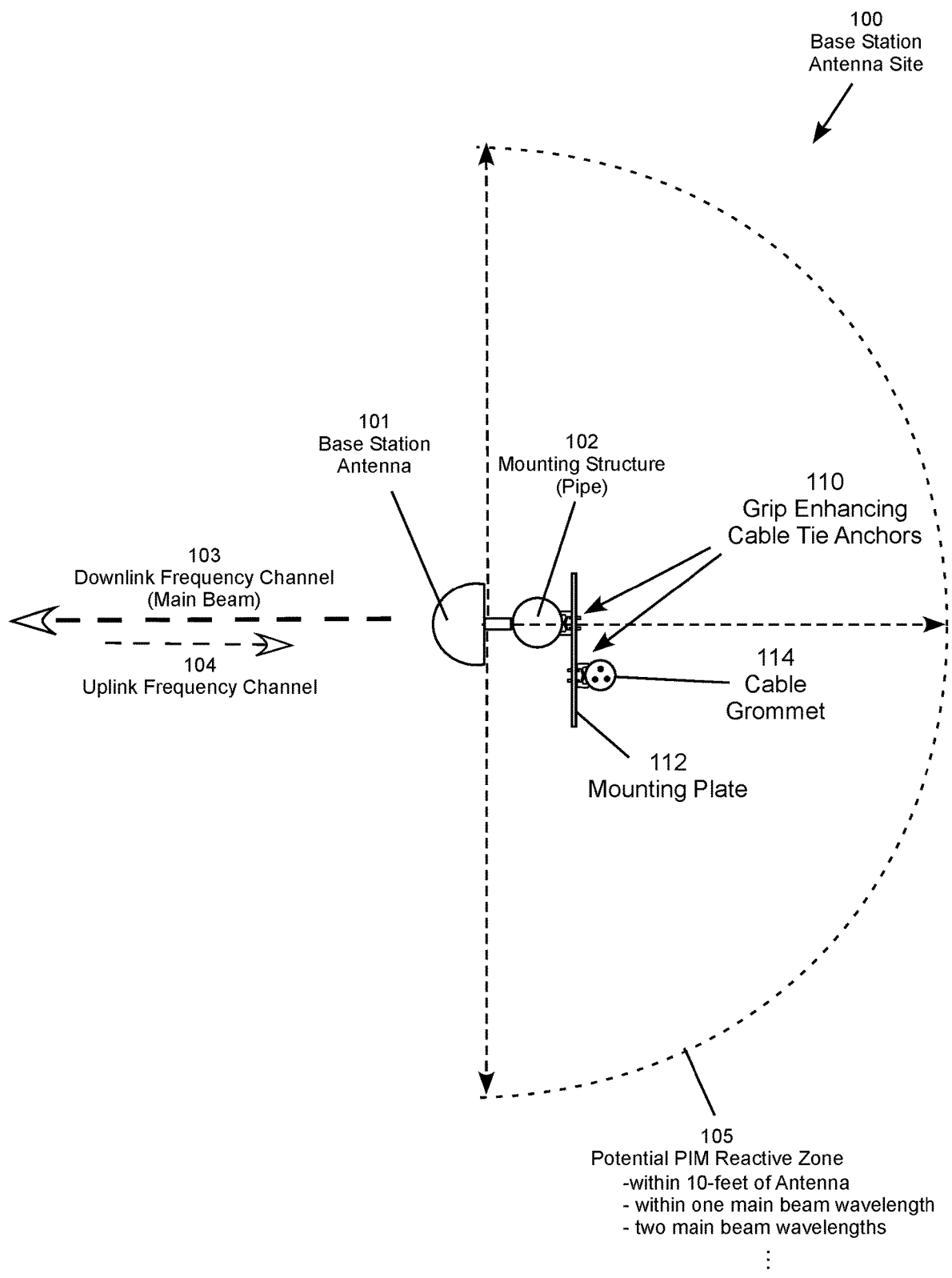
FIG. 10B is a conceptual top view of the grip-enhancing cable tie anchor positioned within the potential PIM reactive zone of the base station antenna.

FIG. 7 is a perspective view of a representative grip-enhancing cable tie anchor 70 securing a cable grommet 72 to a mounting plate 74. The cable grommet 72, in turn, secures several cables 76 effectively providing a robust, low-PIM support of the cables 76 to the mounting plate 74. The mounting is typically attached to a support structure in the PIM reactive region of a cellular base station antenna, as shown in FIGS. 10A and 10B.

Figure 8:
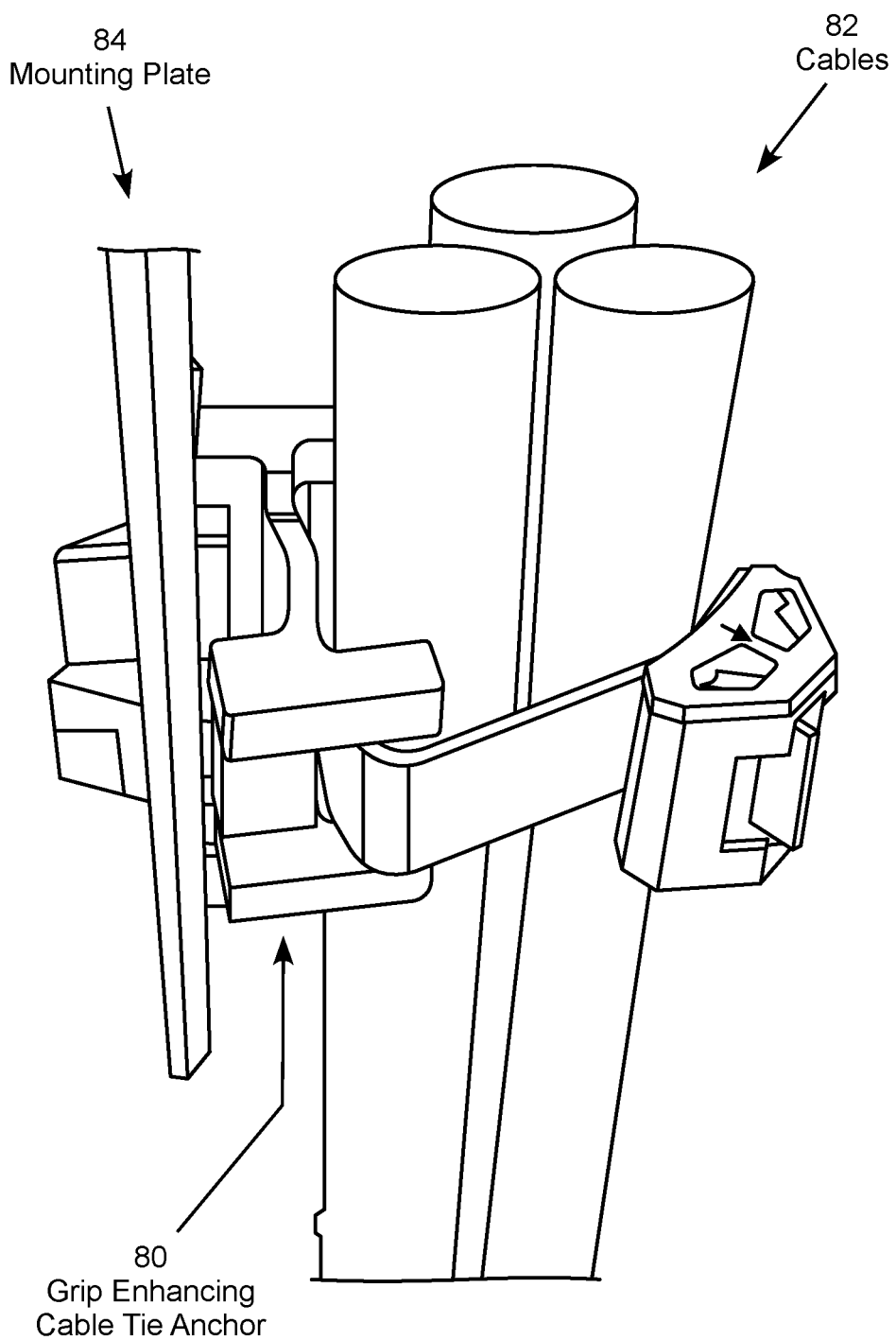
FIG. 8 is a perspective view of the grip-enhancing cable tie anchor securing several cables to a mounting plate.

FIG. 8 shows an alternative embodiment, in which the grip-enhancing cable tie anchor 80 secures several cables 82 to a mounting plate 84 without using a cable grommet.

Figure 9:
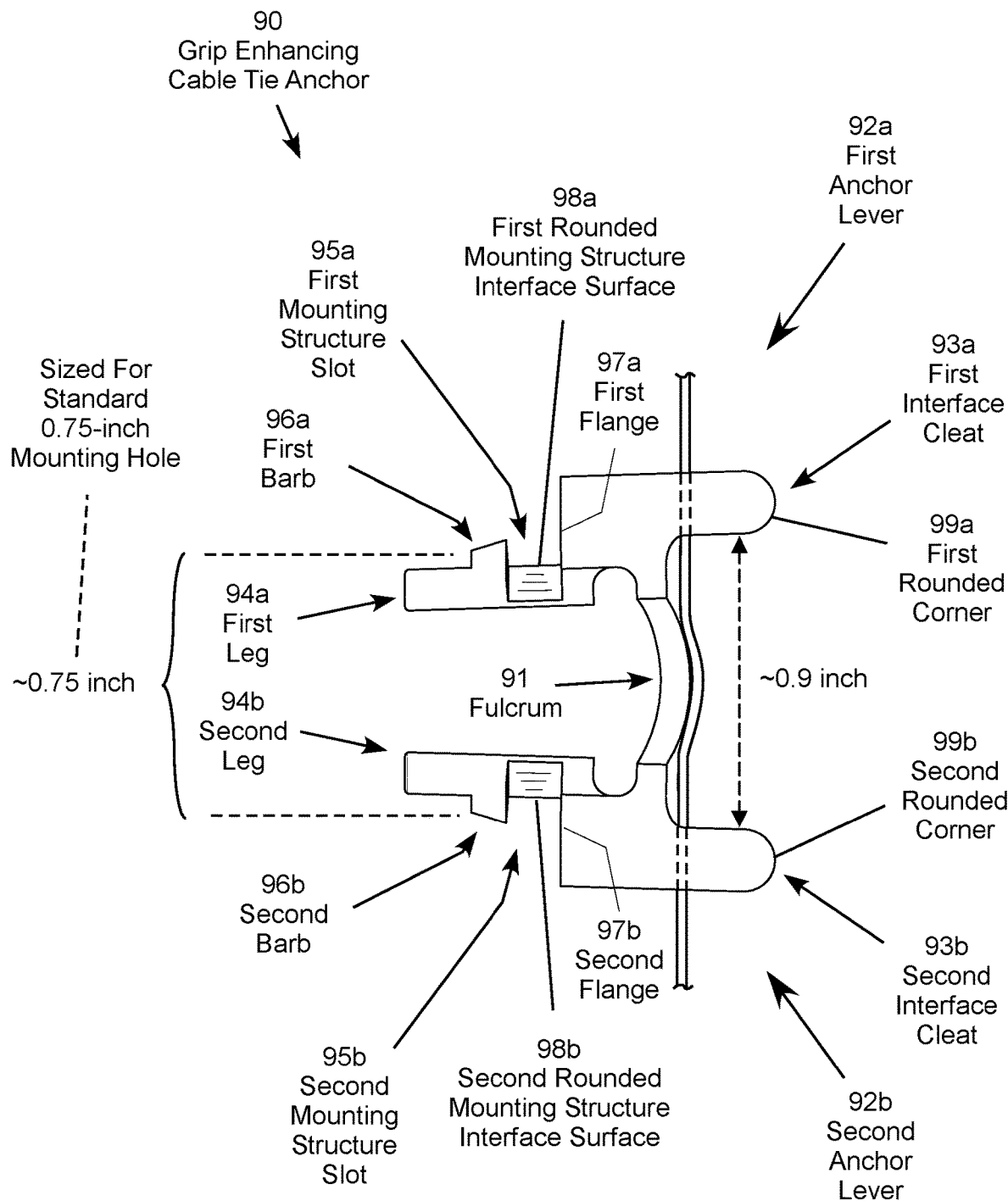
FIG. 9 is a side view of a specific example of the grip-enhancing cable tie anchor indicating representative dimensions.

FIG. 9 is a side view of a specific illustrative embodiment, grip-enhancing cable tie anchor 90, substantially to scale with representative dimensions indicated. The cable tie anchor 90 includes and arcuate fulcrum 91 a first anchor lever 92a including a first interface cleat 93a, and a first leg 94a defining a first mounting structure slot 95a between a first barb 96a and first flange 97a. Similarly, the cable tie anchor 90 includes a second anchor lever 92b including a second interface cleat 93b, and a second leg 94b defining a second mounting structure slot 95b between a second barb 96b and second flange 97b. In this example, the distance between the first and second interface cleats 93a and 93b is about 0.9 inches, while the distance between the first and second legs 94a and 94b is about 0.75 inches sized to be received in a standard 0.75-inch mounting hole. The shape and spacing between the first and second legs 94a and 94b allows the legs to be deflect slightly (inward) transverse to the axial direction for insertion into the mounting hole. Other embodiments may be designed to be received in mounting holes with other diameters, such as 0.5-inch mounting holes, 1.0-inch holes, 1.25-inch mounting holes, etc.

In addition, the first mounting interface slot 95a includes a first rounded mounting structure interface surface 98a contoured to match a round mounting hole. Similarly, the second mounting interface slot 95b includes a second rounded mounting structure interface surface 98b contoured to interface with the round mounting hole. Other embodiments may have interface surfaces contoured to match other mounting structures, such as a flat interface surface shaped to match a bracket slot, a "V" shaped interface surface designed to match a "V" shaped bracket jack, a notched interface surface shaped to match a toothed shaped bracket jack, and so forth. In addition, the interface cleats 93a and 93b create a pinching force when the interface structure is captured between the interface, while they create a tilting force when the interface structure is on top of the interface cleats. The interface cleats 93a and 93b include rounded corners 99a and 99b, respectively, allowing them to slide under the interface structure when the diameter of the interface structure is too large or too small to be pinched between the interface cleats.

It should be appreciated that the arcuate fulcrum 91 is merely illustrative of one specific type of producing fulcrum that serves the dual purposes of retaining the cable tie within the cable tie slots without the use of hands, along with pivoting the anchor levers when the fulcrum is depressed. Other types of protruding fulcrums may alternatively be utilized to serve these same functions. For example, as opposed to the shallow "U" shaped arcuate fulcrum 91 shown in the illustrative embodiment, the fulcrum could have a "V" shape, a "T" shape, a "W" shape, one or more linear walls, or any other suitable protrusion extending into the cable tie route for bending a cable tie extending through the cable tie slots. For example, the fulcrum could be flat (e.g., parallel to the flanges) with one or more curved, flat, linear, or other protrusions at or toward the middle of the fulcrum. The only requirements are the fulcrum directly or indirectly interfere with the cable tie without blocking the insertion of the cable tie to retain the inserted cable tie in place without the use of hands, while also resiliently flexing sufficiently to create the desired pivoting force on the anchor levers when the cable tie is tightened.

In conventional cable securing practice, the mounting structures and cable tie anchors are typically fabricated from metal, such as galvanized steel, known to create loose metal-to-metal contacts producing PIM. To remedy this drawback, the grip-enhancing cable tie anchor includes a low-PIM polymeric material in contact with the mounting structure. For example, substantially all of the cable anchor tie anchor may be fabricated from a high-strength polymeric material, such as glass-filled nylon, polycarbonate, high-density polyethylene (HDPE), or another polymeric material to provide a low-PIM interface between the grip-enhancing cable tie anchors and their mounting structures. As another option, the cable tie anchor may be fabricated from a metallic material with a polymeric layer dip or spray coated on the mounting structure slots, the legs or the entire cable tie anchor. The extent of the polymeric material may be varied in different embodiments so long as the portions of the mounting structure slots in contact with the mounting structure are polymeric to avoid metal-to-metal contact with a metal mounting structure received in the slots. Fabricating the entire cable tie anchor as a single molded piece using polymeric material may be preferred to provide desired cost, weight, strength, and low-PIM characteristics.

FIG. 10A is a conceptual side view and FIG. 10B is a conceptual top view of a representative base station cell site 100 that includes a base station antenna 101 supported by a mounting structure 102. To briefly recap the problem to be solved, the antenna 101 directionally broadcasts higher-power downlink communication signals away from the antenna (generally referred to as the "main beam" of the antenna) within a downlink frequency channel 103 to registered mobile communication devices within the communication reach of the antenna. The antenna 101 also receives lower-power uplink communication signals from the registered mobile communication devices within a separate uplink frequency channel 104 allowing for duplex communications, such as mobile telephone conversations, between the antenna 101 and the registered mobile communication devices within the communication reach of the antenna. Passive intermodulation ("PIM") interference occurs when the downlink signals within the downlink frequency channel 103 mix at nonlinear junctions near the antenna 101 to create noise within the uplink frequency channel 104 received by the antenna. The PIM interference decreases the signal-to-interference plus-noise ratio ("SINR") of the uplink within the uplink channel of the antenna 101, which reduces the communication quality and information carrying capacity (bandwidth) of the uplink frequency channel.

It is well documented that loosely touching metal-to-metal surfaces can behave in a non-linear fashion and become sources of PIM interference when illuminated by high power RF signals. For this reasons, the coaxial cables and other components associated with operation of the antenna are located well outside and behind the main beam of the antenna. It has recently been determined, however, that loose metal-to-metal connections located behind a base station antenna can generate high levels of passive intermodulation. Even though this region is well outside the main beam of the antenna, enough RF energy can be present in this region to excite non-linear objects and generate PIM interference. Metal brackets and associated hardware for supporting RF, optical, ground and remote electrical tilt ("RET") cables are common sources of loose metal-to-metal contact found in this region behind and close to the base station antenna. Embodiments of the present invention include a range of grip enhancing cable tie anchors designed to mitigate the generation of PIM interference by the equipment used to support the cables and other components associated with the operation of the antenna, which are typically located near the antenna outside the main beam of the antenna.

To develop standards for mitigating PIM, technicians may define a potential PIM reactive zone 105 in which PIM mitigation equipment should be installed. FIGS. 10A-10B illustrate this practice for a representative example base station antenna site 100, in which low-PIM grip-enhancing cable tie anchors 110 attach a mounting plate 112 to a mounting pipe 102 which, in turn, support a cable grommet 114 supporting several cables 115 extending form the antenna 101. In this example, the grip-enhancing cable tie anchors 110 are located within a potential PIM reactive zone 105 defined for the antenna 101. In this example, the representative low-PIM grip-enhancing cable tie anchors 110 are located well outside the main beam 103 and physically behind the antenna 101 on the opposite side of the mounting pipe 102 from the antenna. The low-PIM grip-enhancing cable tie anchors 110 are nevertheless specified to provide PIM mitigation because it is still located with the potential PIM reactive zone 105 defined for the antenna 101. The specific grip-enhancing cable tie anchors 110 are representative of the low-PIM cable tie anchors generally, as all of the low-PIM cable tie anchors described in the disclosure, and variations of these specific examples, are intended for deployment as PIM mitigation measures in the potential PIM reactive zones of cellular base station antennas.

While low-PIM grip-enhancing cable tie anchors 110 of the present invention can be utilized in any desired location, they are particularly effective for mitigating PIM interference when deployed in the potential PIM reactive zone 105 near the base station antenna 101. Although PIM generation is a function of the antenna broadcast frequency and power, technicians may use a standard distance, such as 10-feet from the antenna 101, to establish the potential PIM reactive zone 105 where PIM mitigation is appropriate. As other options, the potential PIM reactive zone 105 may be established to be a function of the antenna broadcast frequency, such as one or two wavelengths of the main beam frequency channel 103 of the antenna 101. Other factors, such as the broadcast power of the antenna 101, the presence of reflective surfaces in the physical environment of the antenna, the width of the uplink channel, the use of electronic filtering, and other relevant factors may also be taken into account when establishing the potential PIM reactive zone for a particular antenna. For administrative simplicity, however, the standard set for potential PIM reactive zone 105 may ultimately be defined to be a set distance, such as 10-feet from the antenna.

Although particular embodiments of this disclosure have been illustrated, it is apparent that various modifications and embodiments of the disclosure may be made by those skilled in the art without departing from the scope and spirit of the disclosure. It will therefore be appreciated that the present invention provides significant improvements. The foregoing relates only to the exemplary embodiments of the present invention, and that numerous changes may be made therein without departing from the spirit and scope of the invention as defined by the following claims.

The invention claimed is:

1. A grip-enhancing cable tie anchor, comprising:
a first anchor lever comprising a first interface cleat, a first flange coupled to the first interface cleat, and a first leg coupled to the first flange comprising a first barb forming a first mounting structure slot between the first flange and the first barb;
a second anchor lever comprising a second interface cleat, a second flange coupled to the second interface cleat, and a second leg coupled to the second flange comprising a second barb forming a second mounting structure slot between the second flange and the second barb;
a fulcrum pivotally attached to the first and second anchor cleats;
wherein the fulcrum is positioned so that a cable tie routed through the first and second cable tie slots contacts the fulcrum, and a tightening force on the cable tie imparts an axial force in an axial direction on the fulcrum;
wherein the axial force imparts a pinching or tilting force biasing the first and second legs away from each other imparting a gripping force on a mounting structure captured in the first and second mounting structure slots.

2. The grip-enhancing cable tie anchor of claim 1, wherein the pinching or tilting force also biases the first and second interface cleats toward each other.

3. The grip-enhancing cable tie anchor of claim 1, wherein, once the cable tie is inserted through the cable tie slots, the fulcrum and the cable tie slots create an interference fit with the cable tie retaining the cable tie in the cable tie slots without the use of hands.

4. The grip-enhancing cable tie anchor of claim 1, wherein the first and second interface cleats each comprise a rounded interface surface for contacting a support structure tightened against the cable tie anchor by the tightening force.

5. The grip-enhancing cable tie anchor of claim 1, further comprising a polymeric low-PIM material in contact with the mounting structure.

6. The grip-enhancing cable tie anchor of claim 1, consisting essentially of polymeric low-PIM material.

7. A cable support assembly comprising:
a grip-enhancing cable tie anchor comprising a first anchor lever comprising a first interface cleat, a first flange coupled to the first interface cleat, and a first leg coupled to the first flange comprising a first barb forming a first mounting structure slot between the first flange and the first barb, a second anchor lever comprising a second interface cleat, a second flange coupled to the second interface cleat, and a second leg coupled to the second flange comprising a second barb forming a second mounting structure slot between the second flange and the second barb, and a fulcrum pivotally attached to the first and second anchor cleats;
a mounting structure received in the first and second mounting structure slots;
an interface structure positioned against the interface cleats;
a cable tie routed through the first and second cable tie slots and around the interface structure;
wherein the fulcrum is positioned so that the cable tie contacts the fulcrum and a tightening force on the cable tie imparts an axial force in an axial direction on the fulcrum;
wherein the axial force imparts a pinching or tilting force biasing the first and second legs away from each other imparting a gripping force on the mounting structure captured in the first and second mounting structure slots.

8. The cable support assembly of claim 7, wherein the mounting structure comprises a mounting hole engaged with the first and mounting structure second slots.

9. The cable support assembly of claim 7, wherein the interface structure comprises or supports one or more cables.

10. The cable support assembly of claim 7, wherein the interface structure comprises a cable grommet engaging one or more cables.

11. The cable support assembly of claim 7, wherein the interface structure comprises one or more cables.

12. The cable support assembly of claim 7, wherein the pinching or tilting force also biases the first and second interface cleats toward each other.

13. The cable support assembly of claim 7, wherein the first and second interface cleats each comprise a rounded interface surface for contacting a support structure tightened against the cable tie anchor by the tightening force.

14. The cable support assembly of claim 7, further comprising a polymeric low-PIM material in contact with the mounting structure.

15. A method for supporting an interface structure, comprising:
    providing a grip-enhancing cable tie anchor comprising a first anchor lever comprising a first interface cleat, a first flange coupled to the first interface cleat, and a first leg coupled to the first flange comprising a first barb forming a first mounting structure slot between the first flange and the first barb, a second anchor lever comprising a second interface cleat, a second flange coupled to the second interface cleat, and a second leg coupled to the second flange comprising a second barb forming a second mounting structure slot between the second flange and the second barb, and a fulcrum pivotally attached to the first and second anchor cleats;
    positioning the cable tie anchor on a mounting structure with portions of the mounting structure received in the first and second mounting structure slots;
    positioning an interface structure against the interface cleats;
    routing a cable tie through the first and second cable tie slots and around the interface structure with the fulcrum is positioned in contact with the cable tie;
    applying a tightening force on the cable tie to imparts an axial force in an axial direction on the fulcrum;
    wherein the axial force imparts a pinching or tilting force biasing the first and second legs away from each other imparting a gripping force on the mounting structure captured in the first and second mounting structure slots.

16. The method for supporting an interface structure of claim 15, wherein, once the first and second barbs of the cable tie anchor are inserted through the mounting structure, the barbs create an interference fit with the mounting hole retaining the cable tie anchor in the mounting hole without the use of hands.

17. The method for supporting an interface structure of claim 15, wherein, once the cable tie is inserted through the cable tie slots, the fulcrum and the cable tie slots create an interference fit with the cable tie retaining the cable tie in the cable tie slots without the use of hands.

18. The method for supporting an interface structure of claim 15, further comprising providing the cable tie anchor with a polymeric material in contact with the mounting structure.

19. The method for supporting an interface structure of claim 15, further comprising:
    positioning the cable tie anchor in a PIM reactive zone of a cellular base station antenna;
    wherein the interface structure comprises or supports one or more cables near the antenna.

20. The method for supporting an interface structure of claim 19, wherein the mounting structure comprises a metal mounting plate coupled to a structure supporting the antenna, and the interface structure comprises or supports multiple cables near the antenna.

\* \* \* \* \*